Figure 1:
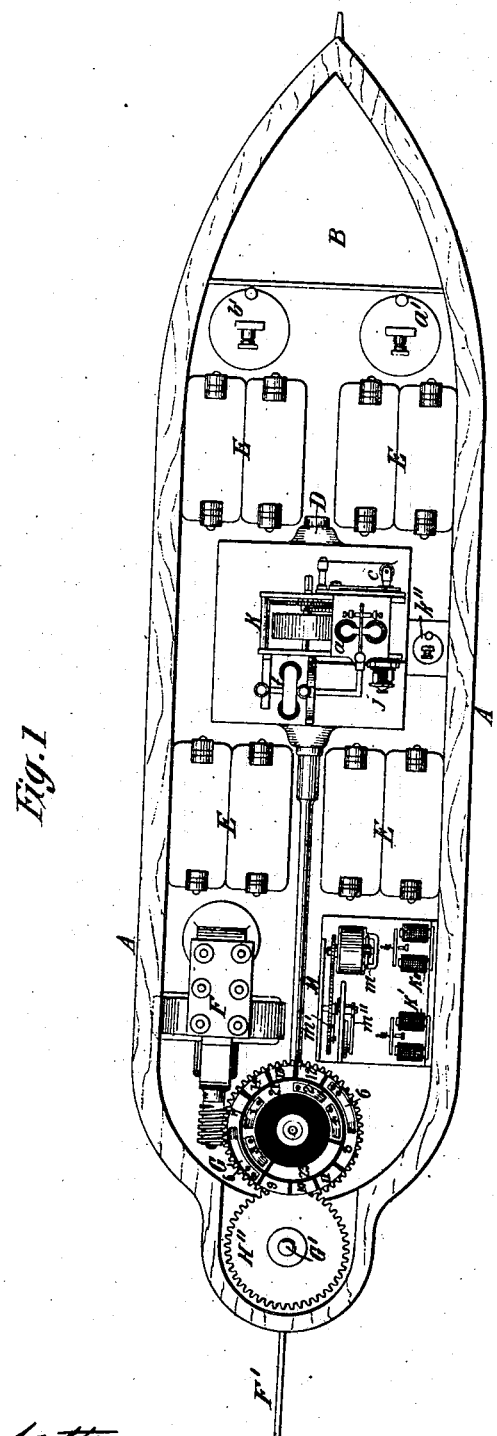

No. 613,809.

N. TESLA.

Patented Nov. 8, 1898.

METHOD OF AND APPARATUS FOR CONTROLLING MECHANISM OF MOVING VESSELS OR VEHICLES.

(No Model.)

5 Sheets—Sheet 1.

Witnesses:
Raphael Netter
George Scherff.

Inventor
Nikola Tesla

No. 613,809. Patented Nov. 8, 1898.
N. TESLA.
METHOD OF AND APPARATUS FOR CONTROLLING MECHANISM OF MOVING VESSELS OR VEHICLES.

(No Model.) 5 Sheets—Sheet 2.

Witnesses:
Raphaël Netter
George Scherff.

Inventor:
Nikola Tesla

No. 613,809. Patented Nov. 8, 1898.
N. TESLA.
METHOD OF AND APPARATUS FOR CONTROLLING MECHANISM OF MOVING VESSELS OR VEHICLES.
(No Model.) 5 Sheets—Sheet 3.
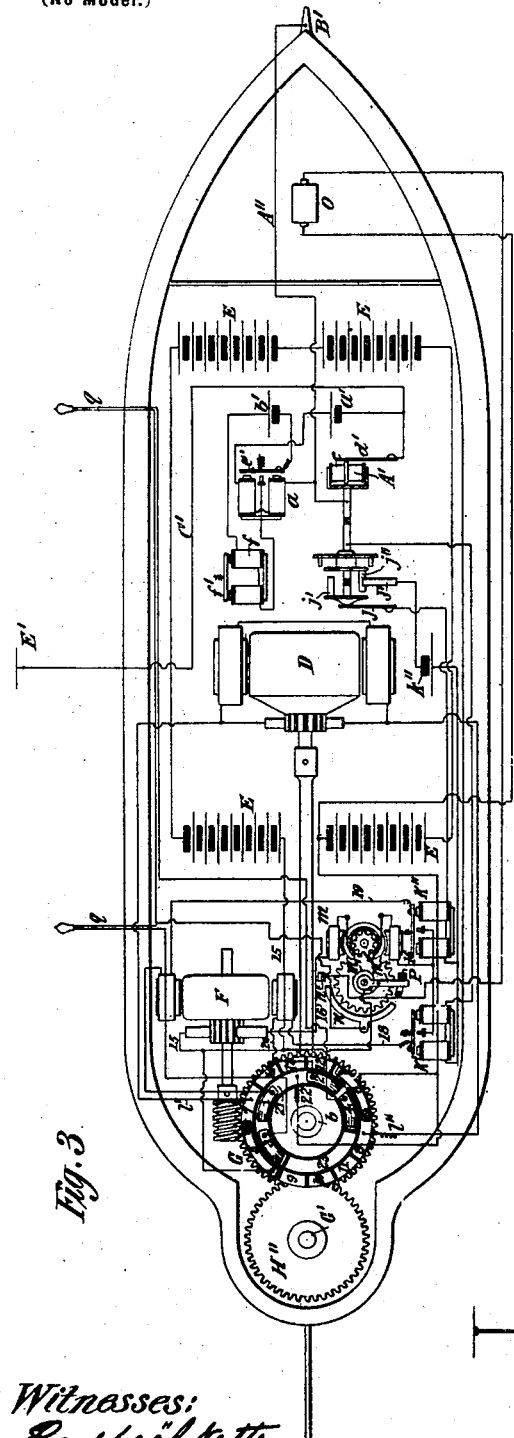
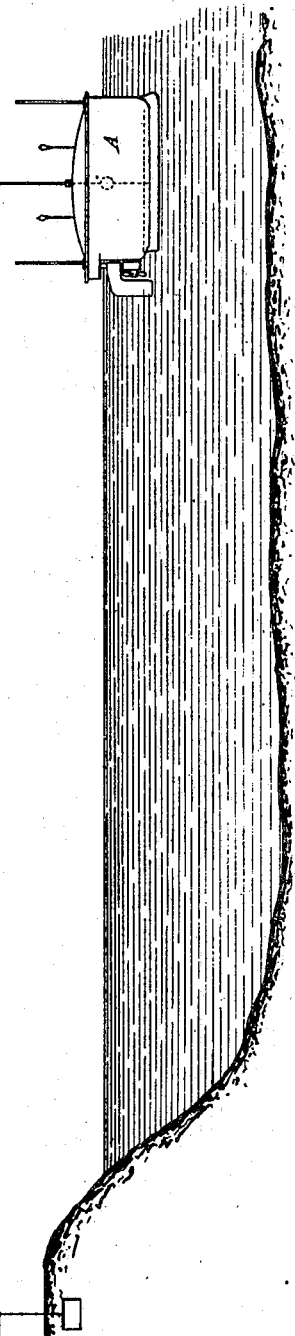
Witnesses:
Raphaël Netter
George Scherff
Inventor
Nikola Tesla No. 613,809. Patented Nov. 8, 1898.
N. TESLA.
METHOD OF AND APPARATUS FOR CONTROLLING MECHANISM OF MOVING VESSELS OR VEHICLES.

(No Model.) 5 Sheets—Sheet 4.

Witnesses:
Raphaël Netter
George Scherff.

Inventor:
Nikola Tesla

No. 613,809.

N. TESLA.

METHOD OF AND APPARATUS FOR CONTROLLING MECHANISM OF MOVING VESSELS OR VEHICLES.

Patented Nov. 8, 1898.

(No Model.)

5 Sheets—Sheet 5.

Witnesses:
Raphaël Netter
M. Lawson Dyer

Inventor
Nikola Tesla
By Kerr, Curtis & Page
attys.

UNITED STATES PATENT OFFICE.

NIKOLA TESLA, OF NEW YORK, N. Y.

METHOD OF AND APPARATUS FOR CONTROLLING MECHANISM OF MOVING VESSELS OR VEHICLES.

SPECIFICATION forming part of Letters Patent No. 613,809, dated November 8, 1898.

Application filed July 1, 1898. Serial No. 684,934. (No model.)

*To all whom it may concern:*

Be it known that I, NIKOLA TESLA, a citizen of the United States, residing at New York, in the county and State of New York, have invented certain new and useful improvements in methods of and apparatus for controlling from a distance the operation of the propelling-engines, the steering apparatus, and other mechanism carried by moving bodies or floating vessels, of which the following is a specification, reference being had to the drawings accompanying and forming part of the same.

The problem for which the invention forming the subject of my present application affords a complete and practicable solution is that of controlling from a given point the operation of the propelling-engines, the steering apparatus, and other mechanism carried by a moving object, such as a boat or any floating vessel, whereby the movements and course of such body or vessel may be directed and controlled from a distance and any device carried by the same brought into action at any desired time. So far as I am aware the only attempts to solve this problem which have heretofore met with any measure of success have been made in connection with a certain class of vessels the machinery of which was governed by electric currents conveyed to the controlling apparatus through a flexible conductor; but this system is subject to such obvious limitations as are imposed by the length, weight, and strength of the conductor which can be practically used, by the difficulty of maintaining with safety a high speed of the vessel or changing the direction of movement of the same with the desired rapidity, by the necessity for effecting the control from a point which is practically fixed, and by many well-understood drawbacks inseparably connected with such a system. The plan which I have perfected involves none of these objections, for I am enabled by the use of my invention to employ any means of propulsion, to impart to the moving body or vessel the highest possible speed, to control the operation of its machinery and to direct its movements from either a fixed point or from a body moving and changing its direction however rapidly, and to maintain this control over great distances without any artificial connections between the vessel and the apparatus governing its movements and without such restrictions as these must necessarily impose.

In a broad sense, then, my invention differs from all of those systems which provide for the control of the mechanism carried by a moving object and governing its motion in that I require no intermediate wires, cables, or other form of electrical or mechanical connection with the object save the natural media in space. I accomplish, nevertheless, similar results and in a much more practicable manner by producing waves, impulses, or radiations which are received through the earth, water, or atmosphere by suitable apparatus on the moving body and cause the desired actions so long as the body remains within the active region or effective range of such currents, waves, impulses, or radiations.

The many and difficult requirements of the object here contemplated, involving peculiar means for transmitting to a considerable distance an influence capable of causing in a positive and reliable manner these actions, necessitated the designing of devices and apparatus of a novel kind in order to utilize to the best advantage various facts or results, which, either through my own investigations or those of others, have been rendered practically available.

As to that part of my invention which involves the production of suitable waves or variations and the conveying of the same to a remote receiving apparatus capable of being operated or controlled by their influence, it may be carried out in various ways, which are at the present time more or less understood. For example, I may pass through a conducting-path, preferably inclosing a large area, a rapidly-varying current and by electromagnetic induction of the same affect a circuit carried by the moving body. In this case the action at a given distance will be the stronger the larger the area inclosed by the conductor and the greater the rate of change of the current. If the latter were generated in the ordinary ways, the rate of change, and consequently the distance at which the action would be practically available for the present purpose, would be very small; but by adopting such means as I have devised—that is, either by passing through the conducting-path currents of a specially-designed high-frequency alternator or, better still, those of a strongly-charged condenser—a very high rate of change may be obtained and the effective range of the influence thus extended over a vast area, and by carefully adjusting the circuit on the moving body so as to be in exact electromagnetic synchronism with the primary disturbances this influence may be utilized at great distances.

Another way to carry out my invention is to direct the currents or discharges of a high-frequency machine or condenser through a circuit one terminal of which is connected directly or inductively with the ground and the other to a body, preferably of large surface and at an elevation. In this case if the circuit on the moving body be similarly arranged or connected differences of potential on the terminals of the circuit either by conduction or electrostatic induction are produced and the same object is attained. Again, to secure the best action the receiving-circuit should be adjusted so as to be in electromagnetic synchronism with the primary source, as before; but in this instance it will be understood by those skilled in the art that if the number of vibrations per unit of time be the same the circuit should now have a length of conductor only one-half of that used in the former case.

Still another way is to pass the currents simply through the ground by connecting both the terminals of the source of high-frequency currents to earth at different and remote points and to utilize the currents spreading through the ground for affecting a receiving-circuit properly placed and adjusted. Again, in this instance if only one of the terminals of the receiving-circuit be connected to the ground, the other terminal being insulated, the adjustment as to synchronism with the source will require that under otherwise equal conditions the length of wire be half of that which would be used if both the terminals be connected or, generally, if the circuit be in the form of a closed loop or coil. Obviously also in the latter case the relative position of the receiving and transmitting circuits is of importance, whereas if the circuit be of the former kind—that is, open—the relative position of the circuits is, as a rule, of little or no consequence.

Finally, I may avail myself, in carrying out my invention, of electrical oscillations which do not follow any particular conducting-path, but propagate in straight lines through space, of rays, waves, pulses, or disturbances of any kind capable of bringing the mechanism of the moving body into action from a distance and at the will of the operator by their effect upon suitable controlling devices.

In the following detailed description I shall confine myself to an explanation of that method and apparatus only which I have found to be the most practical and effectual; but obviously my invention in its broad features is not limited to the special mode and appliances which I have devised and shall here describe.

In any event—that is to say, whichever of the above or similar plans I may adopt—and particularly when the influence exerted from a distance upon the receiving-circuit be too small to directly and reliably affect and actuate the controlling apparatus I employ auxiliary sensitive relays or, generally speaking, means capable of being brought into action by the feeblest influences in order to effect the control of the movements of the distant body with the least possible expenditure of energy and at the greatest practicable distance, thus extending the range and usefulness of my invention.

A great variety of electrical and other devices more or less suitable for the purpose of detecting and utilizing feeble actions are now well known to scientific men and artisans and need not be all enumerated here. Confining myself merely to the electrical as the most practicable of such means and referring only to those which, while not the most sensitive, are perhaps more readily available from the more general knowledge which exists regarding them, I may state that a contrivance may be used which has long been known and used as a lightning-arrester in connection with telephone-switchboards for operating annunciators and like devices, comprising a battery the poles of which are connected to two conducting-terminals separated by a minute thickness of dielectric. The electromotive force of the battery should be such as to strain the thin dielectric layer very nearly to the point of breaking down in order to increase the sensitiveness. When an electrical disturbance reaches a circuit so arranged and adjusted, additional strain is put upon the insulating-film, which gives way and allows the passage of a current which can be utilized to operate any form of circuit-controlling apparatus.

Again, another contrivance capable of being utilized in detecting feeble electrical effects consists of two conducting plates or terminals which have, preferably, wires of some length attached to them and are bridged by a mass of minute particles of metal or other conducting material. Normally these particles lying loose do not connect the metal plates; but under the influence of an electrical disturbance produced at a distance, evidently owing to electrostatic attraction, they are pressed firmly against each other, thus establishing a good electrical connection between the two terminals. This change of state may be made use of in a number of ways for the above purpose.

Still another modified device, which may be said to embody the features of both the former, is obtained by connecting the two conducting plates or terminals above referred to permanently with the poles of a battery which should be of very constant electromotive force. In this arrangement a distant electrical disturbance produces a twofold effect on the conducting particles and insulating-films between them. The former are brought nearer to each other in consequence of the sudden increase of electrostatic attraction, and the latter, owing to this, as well as by being reduced in thickness or in number, are subjected to a much greater strain, which they are unable to withstand.

It will be obviously noted from the preceding that whichever of these or similar contrivances be used the sensitiveness and, what is often still more important, the reliability of operation is very materially increased by a close adjustment of the periods of vibration of the transmitting and receiving circuits, and, although such adjustment is in many cases unnecessary for the successful carrying out of my invention, I nevertheless make it a rule to bestow upon this feature the greatest possible care, not only because of the above-mentioned advantages, which are secured by the observance of the most favorable conditions in this respect, but also and chiefly with the object of preventing the receiving-circuit from being affected by waves or disturbances emanating from sources not under the control of the operator. The narrower the range of vibrations which are still capable of perceptibly affecting the receiving-circuit the safer will the latter be against extraneous disturbances. To secure the best result, it is necessary, as is well known to experts, to construct the receiving-circuit or that part of the same in which the vibration chiefly occurs so that it will have the highest possible self-induction and at the same time the least possible resistance. In this manner I have demonstrated the practicability of providing a great number of such receiving-circuits—fifty or a hundred, or more—each of which may be called up or brought into action whenever desired without the others being interfered with. This result makes it possible for one operator to direct simultaneously the movements of a number of bodies as well as to control the action of a number of devices located on the same body, each of which may have a distinct duty to fulfil. In the following description, however, I shall show a still further development in this direction—namely, how, by making use of merely one receiving-circuit, a great variety of devices may be actuated and any number of different functions performed at the will and command of the distant operator.

It should be stated in advance in regard to the sensitive devices above mentioned, which may be broadly considered as belonging to one class, inasmuch as the operation of all of them involves the breaking down of a minute thickness of highly-strained dielectric, that it is necessary to make some provision for automatically restoring to the dielectric its original unimpaired insulating qualities in order to enable the device to be used in successive operations. This is usually accomplished by a gentle tapping or vibration of the electrodes or particles or continuous rotation of the same; but in long experience with many forms of these devices I have found that such procedures, while suitable in simple and comparatively unimportant operations, as ordinary signaling, when it is merely required that the succeeding effects produced in the receiving-circuit should differ in regard to their relative duration only, in which case it is of little or no consequence if some of the individual effects be altered or incomplete or even entirely missed, do not yield satisfactory results in many instances, when it may be very important that the effects produced should all be exactly such as desired and that none should fail. To illustrate, let it be supposed that an official directing the movements of a vessel in the manner described should find it necessary to bring into action a special device on the latter or to perform a particular operation, perhaps of vital moment, at an instant's notice and possibly when, by design or accident, the vessel itself or any mark indicating its presence is hidden from his view. In this instance a failure or defective action of any part of the apparatus might have disastrous consequences and such cases in which the sure and timely working of the machinery is of paramount importance may often present themselves in practice, and this consideration has impressed me with the necessity of doing away with the defects in the present devices and procedures and of producing an apparatus which while being sensitive will also be most reliable and positive in its action. In the arrangement hereinafter described these defects are overcome in a most satisfactory manner, enabling thousands of successive operations, in all respects alike, being performed by the controlling apparatus without a single irregularity or miss being recorded. For a better understanding of these and other details of the invention as I now carry them out I would refer to the accompanying drawings, in which—

Figure 2:
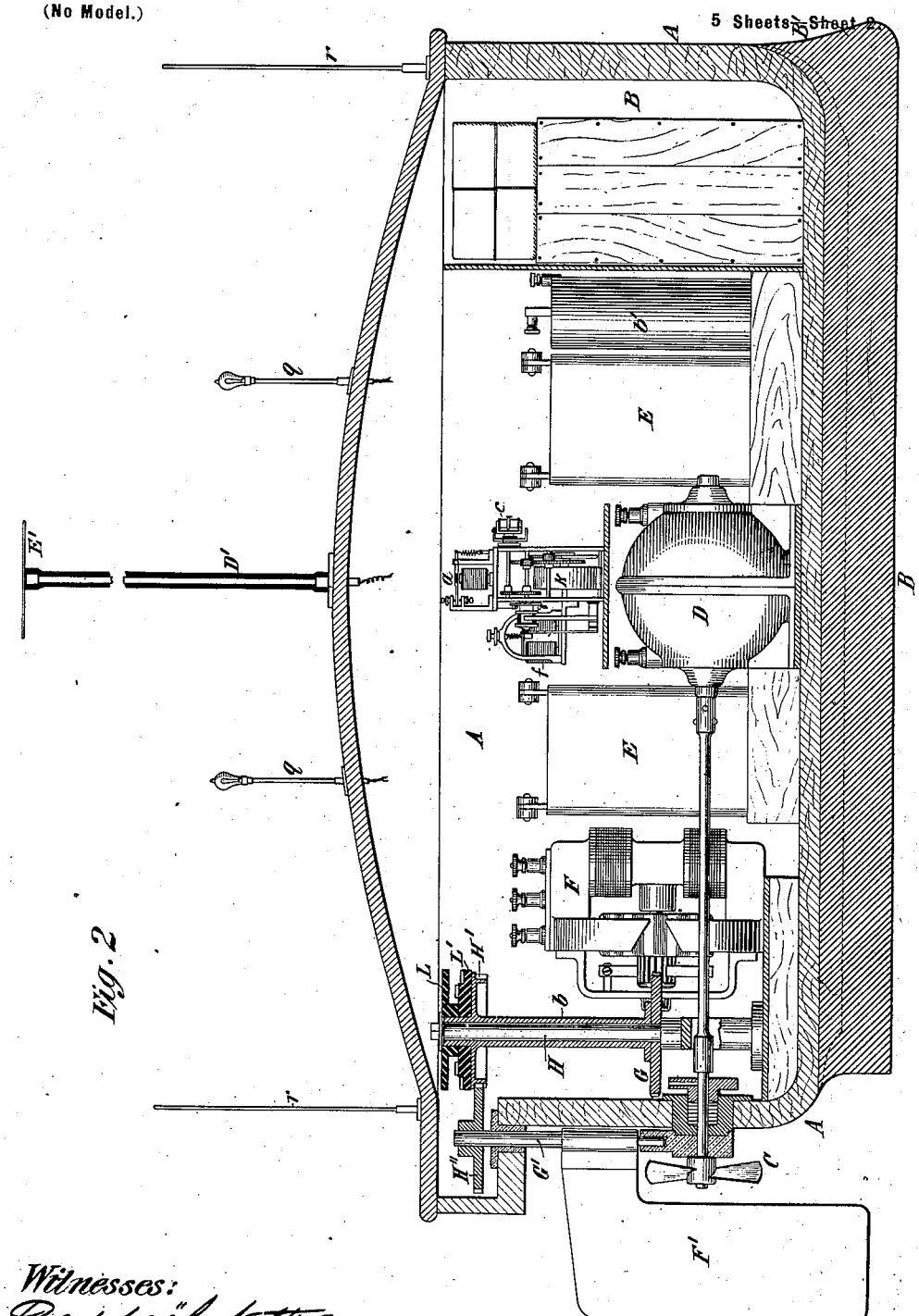
Figure 5:
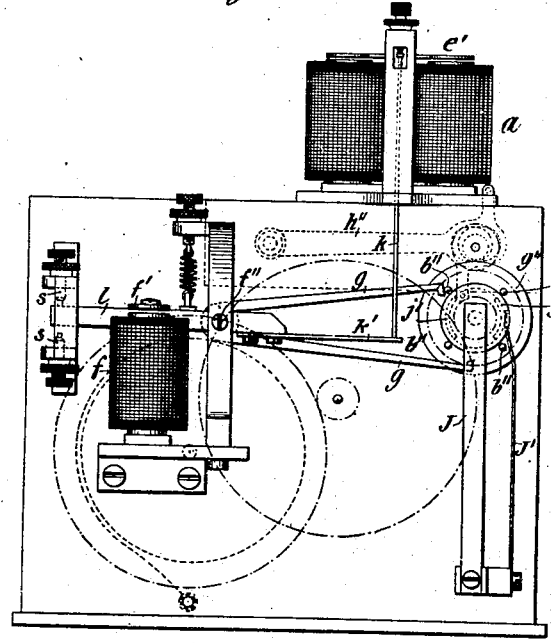
Figure 6:
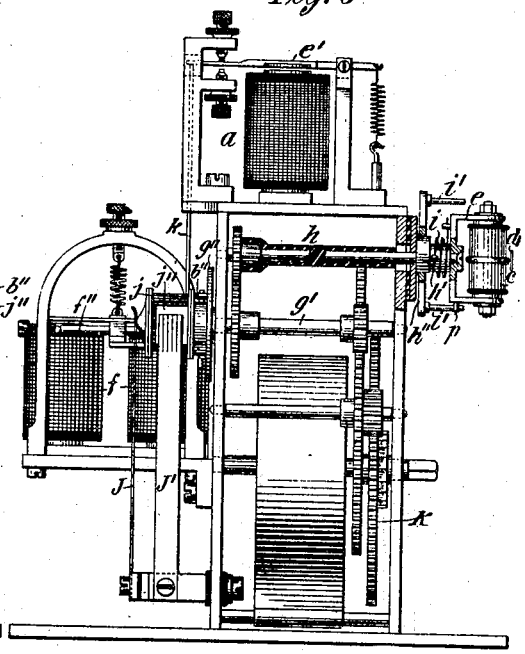
Figure 4:
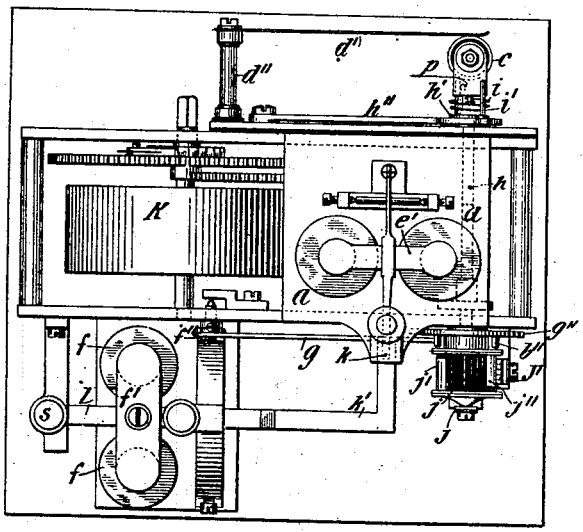
Figure 8:
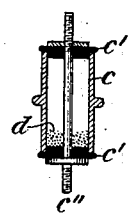
Figure 7:
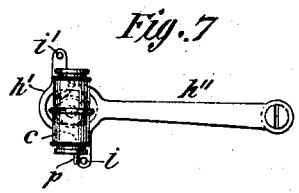
Figure 10:
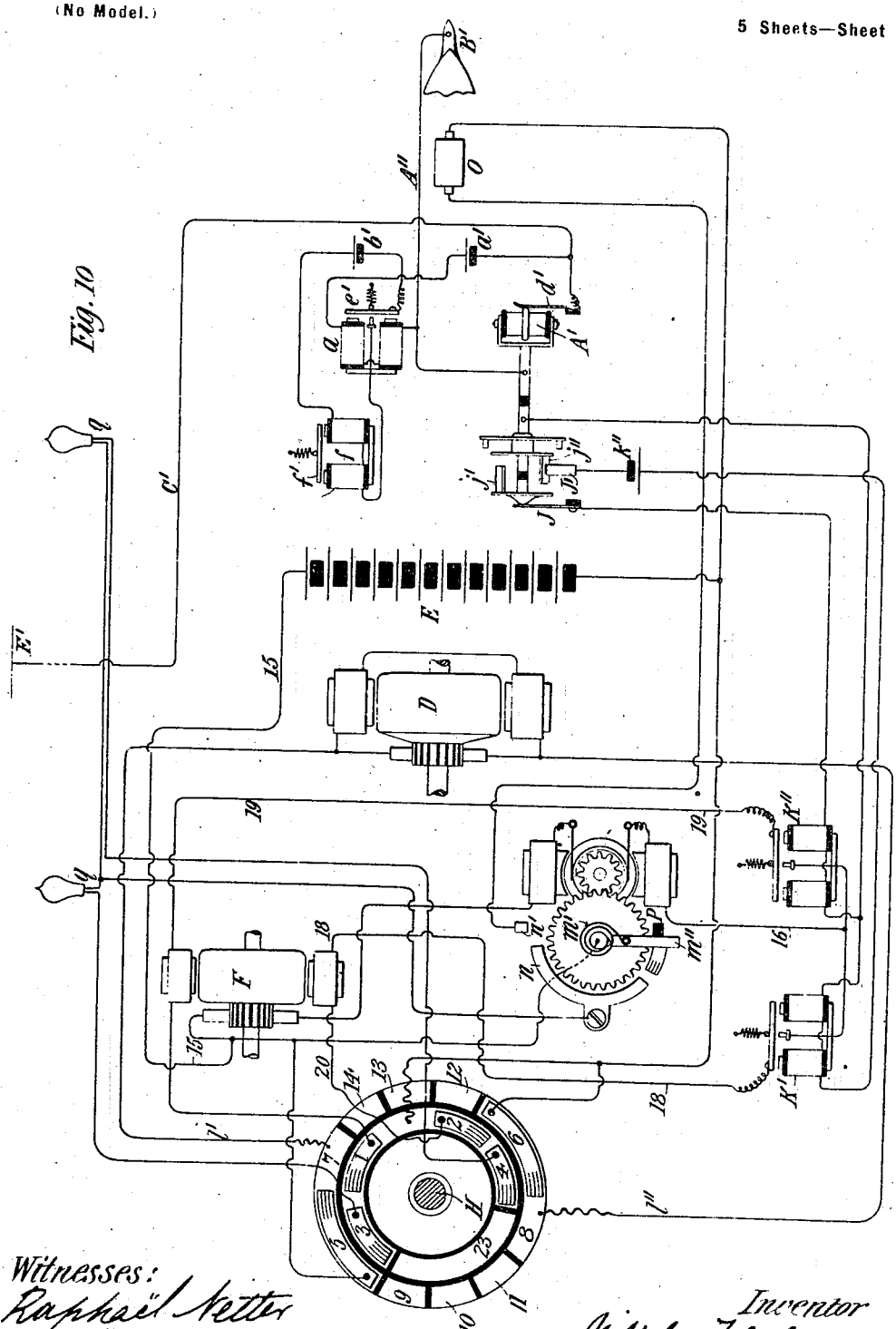

Figure 1 is a plan view of a vessel and mechanism within the same. Fig. 2 is a longitudinal section of the same, showing the interior mechanism in side elevation. Fig. 3 is a plan view, partially diagrammatical, of the vessel, apparatus, and circuit connections of the same. Fig. 4 is a plan view, on an enlarged scale, of a portion of the controlling mechanism. Fig. 5 is an end view of the same. Fig. 6 shows the same mechanism in side elevation. Fig. 7 is a side view of a detail of the mechanism. Fig. 8 is a central sectional view, on a larger scale, of a sensitive device forming part of the receiving-circuit. Fig. 9 is a diagrammatic illustration of the system in its preferred form. Fig. 10 is a view of the various mechanisms employed, but on a larger scale, and leaving out or indicating conventionally certain parts of well-understood character.

Referring to Figs. 1 and 2, A designates any type of vessel or vehicle which is capable of being propelled and directed, such as a boat, a balloon, or a carriage. It may be designed to carry in a suitable compartment B objects of any kind, according to the nature of the uses to which it is to be applied. The vessel—in this instance a boat—is provided with suitable propelling machinery, which is shown as comprising a screw-propeller C, secured to the shaft of an electromagnetic motor D, which derives its power from storage batteries E E E E. In addition to the propelling engine or motor the boat carries also a small steering-motor F, the shaft of which is extended beyond its bearings and provided with a worm which meshes with a toothed wheel G. This latter is fixed to a sleeve $b$, freely movable on a vertical rod H, and is rotated in one or the other direction, according to the direction of rotation of the motor F.

The sleeve $b$ on rod H is in gear, through the cog-wheels H' and H'', with a spindle G, mounted in vertical bearings at the stem of the boat and carrying the rudder F'.

The apparatus by means of which the operation of both the propelling and steering mechanisms is controlled involves, primarily, a receiving-circuit, which for reasons before stated is preferably both adjusted and rendered sensitive to the influence of waves or impulses emanating from a remote source, the adjustment being so that the period of oscillation of the circuit is either the same as that of the source or a harmonic thereof.

The receiving-circuit proper (diagrammatically shown in Figs. 3 and 10) comprises a terminal E', conductor C', a sensitive device A', and a conductor A'', leading to the ground conveniently through a connection to the metal keel B' of the vessel. The terminal E' should present a large conducting-surface and should be supported as high as practicable on a standard D', which is shown as broken in Fig. 2; but such provisions are not always necessary. It is important to insulate very well the conductor C' in whatever manner it be supported.

The circuit or path just referred to forms also a part of a local circuit, which latter includes a relay-magnet $a$ and a battery $a'$, the electromotive force of which is, as before explained, so determined that although the dielectric layers in the sensitive device A' are subjected to a great strain, yet normally they withstand the strain and no appreciable current flows through the local circuit; but when an electrical disturbance reaches the circuit the dielectric films are broken down, the resistance of the device A' is suddenly and greatly diminished, and a current traverses the relay-magnet A.

The particular sensitive device employed is shown in general views and in detail in Figs. 4, 6, 7, and 8. It consists of a metal cylinder $c$, with insulating-heads $c'$, through which passes a central metallic rod $c''$. A small quantity of grains $d$ of conducting material, such as an oxidized metal, is placed in the cylinder. A metallic strip $d'$, secured to an insulated post $d''$, bears against the side of the cylinder $c$, connecting it with the conductor C', forming one part of the circuit. The central rod $c''$ is connected to the frame of the instrument and so to the other part of the circuit through the forked metal arm $e$, the ends of which are fastened with two nuts to the projecting ends of the rod, by which means the cylinder $c$ is supported.

In order to interrupt the flow of battery-current which is started through the action of the sensitive device A', special means are provided, which are as follows: The armature $e'$ of the magnet $a$, when attracted by the latter, closes a circuit containing a battery $b'$ and magnet $f$. The armature-lever $f'$ of this magnet is fixed to a rock-shaft $f''$, to which is secured an anchor-escapement $g$, which controls the movements of a spindle $g'$, driven by a clock-train K. The spindle $g'$ has fixed to it a disk $g''$ with four pins $b''$, so that for each oscillation of the escapement $g$ the spindle $g'$ is turned through one-quarter of a revolution. One of the spindles in the clock-train, as $h$, is geared so as to make one-half of a revolution for each quarter-revolution of spindle $g'$. The end of the former spindle extends through the side of the frame and carries an eccentric cylinder $h'$, which passes through a slot in a lever $h''$, pivoted to the side of the frame. The forked arm $e$, which supports the cylinder $c$, is pivoted to the end of eccentric $h'$, and the eccentric and said arm are connected by a spiral spring $l$. Two pins $i'$ $i'$ extend out from the lever $h''$, and one of these is always in the path of a projection on arm $e$. They operate to prevent the turning of cylinder $c$ with the spindle $h$ and the eccentric. It will be evident that a half-revolution of the spindle $h$ will wind up the spring $i$ and at the same time raise or lower the lever $h''$, and these parts are so arranged that just before the half-revolution of the spindle is completed the pin $i'$, in engagement with projection or stop-pin $p$, is withdrawn from its path, and the cylinder $c$, obeying the force of the spring $i$, is suddenly turned end for end, its motion being checked by the other pin $i'$. The adjustment relatively to armature $f'$ of magnet $f$ is furthermore so made that the pin $i'$ is withdrawn at the moment when the armature has nearly reached its extreme position in its approach toward the magnet—that is, when the lever $l$, which carries the armature $f'$, almost touches the lower one of the two stops $s$ $s$, Fig. 5—which limits its motion in both directions.

The arrangement just described has been the result of long experimenting with the object of overcoming certain defects in devices of this kind, to which reference has been made before. These defects I have found to be due to many causes, as the unequal size, weight, and shape of the grains, the unequal pressure which results from this and from the manner in which the grains are usually agitated, the lack of uniformity in the conductivity of the surface of the particles owing to the varying thickness of the superficial oxidized layer, the varying condition of the gas or atmosphere in which the particles are immersed, and to certain deficiencies, well known to experts, of the transmitting apparatus as heretofore employed, which are in a large measure reduced by the use of my improved high-frequency coils. To do away with the defects in the sensitive device, I prepare the particles so that they will be in all respects as nearly alike as possible. They are manufactured by a special tool, insuring their equality in size, weight, and shape, and are then uniformly oxidized by placing them for a given time in an acid solution of predetermined strength. This secures equal conductivity of their surfaces and stops their further deterioration, thus preventing a change in the character of the gas in the space in which they are inclosed. I prefer not to rarefy the atmosphere within the sensitive device, as this has the effect of rendering the former less constant in regard to its dielectric properties, but merely secure an air-tight inclosure of the particles and rigorous absence of moisture, which is fatal to satisfactory working.

The normal position of the cylinder $c$ is vertical, and when turned in the manner described the grains in it are simply shifted from one end to the other; but inasmuch as they always fall through the same space and are subjected to the same agitation they are brought after each operation of the relay to precisely the same electrical condition and offer the same resistance to the flow of the battery-current until another impulse from afar reaches the receiving-circuit.

The relay-magnet $a$ should be of such character as to respond to a very weak current and yet be positive in its action. To insure the retraction of its armature $e'$ after the current has been established through the magnet $f$ and interrupted by the inversion of the sensitive device $c$, a light rod $k$ is supported in guides on the frame in position to be lifted by an extension $k'$ of the armature-lever $l$ and to raise slightly the armature $e$. As a feeble current may normally flow through the sensitive device and the relay-magnet $a$, which would be sufficient to hold though not draw the armature down, it is well to observe this precaution.

The operation of the relay-magnet $a$ and the consequent operation of the electromagnet $f$, as above described, are utilized to control the operation of the propelling-engine and the steering apparatus in the following manner: On the spindle $g'$, which carries the escapement-disk $g''$, Figs. 4 and 6, is a cylinder $j$ of insulating material with a conducting plate or head at each end. From these two heads, respectively, contact plates or segments $j'$ $j''$ extend on diametrically opposite sides of the cylinder. The plate $j''$ is in electrical connection with the frame of the instrument through the head from which it extends, while insulted strips or brushes J J' bear upon the free end or head of the cylinder and the periphery of the same, respectively. Three terminals are thus provided, one always in connection with plate $j'$, the other always in connection with the plate $j''$, and the third adapted to rest on the strips $j'$ and $j''$ in succession or upon the intermediate insulating-spaces, according to the position in which the commutator is brought by the clock-train and the anchor-escapement $g$.

K' K'', Figs. 1, 3, and 10, are two relay-magnets conveniently placed in the rear of the propelling-engine. One terminal of a battery $k''$ is connected to one end of each of the relay-coils, the opposite terminal to the brush J', and the opposite ends of the relay-coils to the brush J and to the frame of the instrument, respectively. As a consequence of this arrangement either the relay K' or K'' will be energized as the brush J' bears upon the plate $j'$ or $j''$, respectively, or both relays will be inactive while the brush J' bears upon an insulating-space between the plates $j'$ and $j''$. While one relay, as K', is energized, its armature closes a circuit through the motor F, which is rotated in a direction to throw the rudder to port. On the other hand, when relay K'' is active another circuit through the motor F is closed, which reverses its direction of rotation and shifts the rudder to starboard. These circuits, however, are at the same time utilized for other purposes, and their course is, in part, through apparatus which I shall describe before tracing their course.

The fixed rod H carries an insulating disk or head L, Fig. 2, to the under side of which are secured six brushes, 1, 2, 3, 4, 5, and 6, Fig. 3. The sleeve $b$, which surrounds the rod and is turned by the steering-motor F, carries a disk L', upon the upper face of which are two concentric circles of conducting contact-plates. Brushes 1, 2, 3, and 4 bear upon the inner circle of contacts, while the brushes 5 and 6 bear upon the outer circle of contacts. The outer circle of contacts comprises two long plates 7 and 8 on opposite sides of the disk and a series of shorter plates 9, 10, 11, 12, 13, and 14 in the front and rear. Flexible conductors $l'$ $l''$ connect the plates 7 and 8 with the terminals of the propelling-motor D, and the poles of the main battery E are connected to the brushes 5 and 6, respectively, so that while the rudder is straight or turned up to a certain angle to either side the current is conveyed through the brushes 5 and 6 and segments 7 and 8 to the propelling-motor D. The steering-motor F is also driven by current taken from the main battery E in the following manner: A conductor 15 from one pole of the battery leads to one of the commutator-brushes, and from the other brush runs a conductor 16 to one of the contacts of each relay K' K". When one of these relays, as K", is active, it continues this circuit through a wire 19 through one field-coil or set of coils on the motor F and thence to the brush 1. In a similar manner when the other relay K' is active the circuit is continued from wire 18 through a wire 20, the second or reversing set of field-coils, and to brush 2.

Both brushes 1 and 2 at all times when the rudder is not turned more than about forty-five degrees to one side are in contact with a long conducting-plate 21, and one brush in any position of the rudder is always in contact with said plate, and the latter is connected by a flexible conductor 22 with the opposite pole of the main battery. Hence the motor F may always be caused to rotate in one direction whatever may be the position of the rudder, and may be caused to rotate in either direction whenever the position of the rudder is less than a predetermined angle, conveniently forty-five degrees from the center position. In order, however, to prevent the rudder from being turned too far in either direction, the isolated plate 23 is used. Any movement of the rudder beyond a predetermined limit brings this plate under one or the other of the brushes 1 2 and breaks the circuit of motor F, so that the rudder can be driven no farther in that direction, but, as will be understood, the apparatus is in condition to turn the rudder over to the other side. In like manner the circuit of the propelling-motor D is controlled through brushes 5 and 6 and the segments on the outer circle of contacts of head L. If the short segments on either side of the circle are insulated, the motor D will be stopped whenever one of the brushes 5 or 6 passes onto one of them from the larger segments 7 8.

It is important to add that on all contact-points where a break occurs provision should be made to overcome the sparking and prevent the oscillation of electrical charges in the circuits, as such sparks and oscillations may affect the sensitive device. It is this consideration chiefly which makes it advisable to use the two relays K' K", which otherwise might be dispensed with. They should be also placed as far as practicable from the sensitive device in order to guard the latter against any action of strong varying currents.

In addition to the mechanism described the vessel may carry any other devices or apparatus as might be required for accomplishing any special object of more or less importance. By way of illustration a small motor $m$ is shown, Figs. 1 and 3, which conveniently serves for a number of purposes. This motor is shown connected in series with the armature of the steering-motor F, so that whenever either one of the circuits of the latter is closed through relays K' K" the motor $m$ is likewise rotated, but in all cases in the same direction. Its rotation is opposed by a spring $m'$, so that in normal operation, owing to the fact that the circuits of motor F are closed but a short time, the lever $m''$, which is fastened to one of the wheels of clockwork M, with which the armature of the motor is geared, will move but a short distance and upon cessation of the current return to a stop P; but if the circuits of the motor F are closed and opened rapidly in succession, which operation leaves the rudder unaffected, then the lever $m''$ is moved to a greater angle, coming in contact with a metal plate $n$, and finally, if desired, with a post $n'$. Upon the lever $m''$ coming in contact with plate $n$ the current of the main battery passes either through one or other or both of the lights supported on standards $q$ $q$, according to the position of brushes 3 and 4 relatively to the insulating-segment 23; but since the head L, carrying the segments, is geared to the rudder the position of the latter is in a general way determined by observing the lights. Both of the lights may be colored, and by flashing them up whenever desired the operator may guide at night the vessel in its course. For such purposes also the standards $r$ $r$ are provided, which should be painted in lively colors, so as to be visible by day at great distances. By opening and closing the circuits of motor F a greater number of times, preferably determined beforehand, the lever $m''$ is brought in contact with post $n'$, thus closing the circuit of the main battery through a device $o$ and bringing the latter into action at the moment desired. By similar contrivances or such as will readily suggest themselves to mechanicians any number of different devices may be operated.

Referring now to Fig. 9, which illustrates diagrammatically the system as practiced when directing the movements of a boat, in this figure S designates any source of electrical disturbance or oscillations the generation of which is controlled by a suitable switch contained in box T. The handle of the switch is movable in one direction only and stops on four points $t$ $t'$ $u$ $u'$, so that as the handle passes from stop to stop oscillations are produced by the source during a very short time interval. There are thus produced four disturbances during one revolution and the receiving-circuit is affected four times; but it will be understood from the foregoing description of the controlling devices on the vessel that the rudder will be moved twice, once to right and once to left. Now I preferably place the handle of the switch so that when it is arrested on points $t$ $t'$—that is, to the right or left of the operator—he is reminded that the vessel is being deflected to the right or left from its course, by which means the control is facilitated. The normal positions of the handle are therefore at $u$ $u'$ when the rudder is not acted upon, and it remains on the points $u$ $u'$ only so long as necessary. Since, as before stated, the working of the apparatus is very sure, the operator is enabled to perform any such operations as provision is made for without even seeing the vessel.

The manner of using the apparatus and the operation of the several instrumentalities comprising the same is in detail as follows: Normally the plate L' is turned so that brush 2 rests upon the insulated segment 23 and brush 6 upon one of the insulated short segments in the rear of the circle. Under these conditions the rudder will be turned to starboard and the circuit of motor D interrupted between brushes 5 and 6. At the same time only one of the circuits of motor F—that controlled by relay K'—is capable of being closed, since brush 2, which connects with the other, is out of contact with the long segment 21. Assuming now that it is desired to start the vessel and direct it to a given point, the handle T is turned from its normal position on point $u'$ to the point $t$ on the switch-box. This sends out an electrical disturbance, which, passing through the receiving-circuit on the vessel, affects the sensitive device A' and starts the flow of current through the local circuit, including said device, the relay $a$, and the battery $a'$. This, as has been previously explained, turns the cylinder $j$ and causes the brush J' to pass from insulation onto the contact $j'$. The battery $k''$ is thus closed through relay K'', and the latter closes that circuit of the motor F which, starting from plate 22, which is permanently connected with one pole of the main battery, is completed through the brush 1, the field of motor F, wire 19, the armature of relay K'', wire 16, the motor $m$, the brushes and commutator of motor F, and wire 15 to the opposite terminal of the battery E. Motor F is thus set in operation to shift the rudder to port; but the movement of plate L' which follows brings the brush 6 back onto segment 8 and closes the circuit of the propelling-motor which starts the vessel. The motor F is permitted to run until the rudder has been turned sufficiently to steer the vessel in the desired direction, when the handle T is turned to the point $u$. This produces another action of the relay $a$ and brush J' is shifted onto insulation and both relays K' and K'' are inactive. The rudder remains in the position to which it has been shifted by the motor F. If it be then desired to shift it to starboard, or in the opposite direction to that in which it was last moved, the handle T is simply turned to point $t'$ and allowed to remain there until the motor F, which is now operated by relay K', the circuit of which is closed by strip J' coming into contact with plate $j'''$, has done its work. The movement of handle T to the next point throws out both relays K' and K'', and the next movement causes a shifting of the rudder to port, and so on. Suppose, however, that after the rudder has been set at any angle to its middle position it be desired to shift it still farther in the same direction. In such case the handle is moved quickly over two points, so that the circuit which would move the rudder in the opposite direction is closed for too short a time interval to produce an appreciable effect and is allowed to rest on the third point until the rudder is shifted to the desired position, when the handle is moved to the next point, which again throws out both relays K' and K''. It will be understood that if the handle be held for a sufficiently long time upon either point $t$ or $t'$ the motor F will simply turn the plate L' in one direction or the other until the circuits of motors D and F are broken. It is furthermore evident that one relay K' or K'' will always be operative to start the motor F.

As previously explained, the longest period of operation of which the motor F is capable under ordinary conditions of use does not permit the motor $m$ to shift the arm $m'$ into contact with the plate $n$; but if the handle T be turned with a certain rapidity a series of current impulses will be directed through motor $m$; but as these tend to rotate the motor F in opposite directions they do not sensibly affect the latter, but act to rotate the motor $m$ against the force of the coiled spring.

The invention which I have described will prove useful in many ways. Vessels or vehicles of any suitable kind may be used, as life, despatch, or pilot boats or the like, or for carrying letters, packages, provisions, instruments, objects, or materials of any description, for establishing communication with inaccessible regions and exploring the conditions existing in the same, for killing or capturing whales or other animals of the sea, and for many other scientific, engineering, or commercial purposes; but the greatest value of my invention will result from its effect upon warfare and armaments, for by reason of its certain and unlimited destructiveness it will tend to bring about and maintain permanent peace among nations.

Having now described my invention, what I claim is—

1. The improvement in the art of controlling the movements and operation of a vessel or vehicle herein described, which consists in producing waves or disturbances which are conveyed to the vessel by the natural media, actuating thereby suitable apparatus on the vessel and effecting the control of the propelling-engine, the steering and other mechanism by the operation of the said apparatus, as set forth.

2. The improvement in the art of controlling the movements and operation of a vessel or vehicle, herein described, which consists in establishing a region of waves or disturbances, and actuating by their influence exerted at a distance the devices on such vessel or vehicle, which control the propelling, steering and other mechanism thereon, as set forth.

3. The improvement in the art of controlling the movements and operation of a vessel or vehicle, herein described, which consists in establishing a region of electrical waves or disturbances, and actuating by their influence, exerted at a distance, the devices on said vessel or vehicle, which control the propelling, steering and other mechanism thereon, as set forth.

4. The improvement in the art of controlling the movements and operation of a vessel or vehicle, herein described, which consists in providing on the vessel a circuit controlling the propelling, steering and other mechanism, adjusting or rendering such circuit sensitive to waves or disturbances of a definite character, establishing a region of such waves or disturbances, and rendering by their means the controlling-circuit active or inactive, as set forth.

5. The combination with a source of electrical waves or disturbances of a moving vessel or vehicle, and mechanism thereon for propelling, steering or operating the same, and a controlling apparatus adapted to be actuated by the influence of the said waves or disturbances at a distance from the source, as set forth.

6. The combination with a source of electrical waves or disturbances of a moving vessel or vehicle, mechanism for propelling, steering or operating the same, a circuit and means therein for controlling said mechanism, and means for rendering said circuit active or inactive through the influence of the said waves or disturbances exerted at a distance from the source, as set forth.

7. The combination with a source of electrical waves or disturbances and means for starting and stopping the same, of a vessel or vehicle, propelling and steering mechanism carried thereby, a circuit containing or connected with means for controlling the operation of said mechanism and adjusted or rendered sensitive to the waves or disturbances of the source, as set forth.

8. The combination with a source of electrical waves or disturbances, and means for starting and stopping the operation of the same, of a vessel or vehicle, propelling and steering mechanism carried thereby, local circuits controlling said mechanisms, a circuit sensitive to the waves or disturbances of the source and means therein adapted to control the said local circuits, as and for the purpose set forth.

9. The sensitive device herein described comprising in construction a receptacle containing a material such as particles of oxidized metal forming a part of the circuit, and means for turning the same end for end when the material has been rendered active by the passage through it of an electric discharge, as set forth.

10. The sensitive device herein described, comprising in combination a receptacle containing a material such as particles of oxidized metal forming a part of an electric circuit, an electromagnet in said circuit, and devices controlled thereby for turning the receptacle end for end when said magnet is energized, as set forth.

11. The sensitive device herein described, comprising in combination a receptacle containing a material such as particles of oxidized metal forming part of an electric circuit, a motor for rotating the receptacle, an electromagnet in circuit with the material, and an escapement controlled by said magnet and adapted to permit a half-revolution of the receptacle when the said magnet is energized, as set forth.

12. The combination with a movable body or vehicle, of a propelling-motor, a steering-motor and electrical contacts carried by a moving portion of the steering mechanism, and adapted in certain positions of the latter to interrupt the circuit of the propelling-motor, a local circuit and means connected therewith for controlling the steering-motor, and a circuit controlling the local circuit and means for rendering said controlling-circuit sensitive to the influence of electric waves or disturbances exerted at a distance from their source, at set forth.

13. The combination with the steering-motor, a local circuit for directing current through the same in opposite directions, a controlling-circuit rendered sensitive to the influence of electric waves or disturbances exerted at a distance from their source, a motor in circuit with the steering-motor but adapted to run always in the same direction, and a local circuit or circuits controlled by said motor, as set forth.

NIKOLA TESLA.

Witnesses:
RAPHAËL NETTER,
GEORGE SCHERFF.